United States Patent [19]

DiMaio et al.

[11] Patent Number: 5,169,621
[45] Date of Patent: Dec. 8, 1992

[54] METHOD FOR COATING FASTENERS

[75] Inventors: Anthony DiMaio, Memphis; Richard J. Duffy, Utica; Eugene Sessa, Mt. Clemens, all of Mich.

[73] Assignee: Nylok Fastener Corporation, Rochester, Mich.

[21] Appl. No.: 748,773

[22] Filed: Sep. 16, 1991

Related U.S. Application Data

[62] Division of Ser. No. 422,602, Oct. 17, 1989, Pat. No. 5,078,083.

[51] Int. Cl.⁵ .......................... B05D 1/12; B05D 3/02
[52] U.S. Cl. ..................................... 427/195; 118/308; 118/319; 118/322; 427/318; 427/346; 427/398.3; 427/398.5; 427/425; 427/543
[58] Field of Search ................. 427/46, 195, 318, 346, 427/398.3, 398.5, 425; 118/308, 319, 320, 322, 620; 10/10 P

[56] References Cited

U.S. PATENT DOCUMENTS

| | | | |
|---|---|---|---|
| 3,830,902 | 8/1974 | Barnes | 118/308 |
| 4,082,058 | 4/1978 | Dieme | 118/319 |
| 4,155,327 | 5/1979 | Alexander et al. | 118/319 |
| 4,366,190 | 12/1982 | Rodden et al. | 118/308 |
| 4,835,819 | 6/1989 | Duffy et al. | 427/195 |

Primary Examiner—Michael G. Wityshyn
Attorney, Agent, or Firm—Niro, Scavone, Haller & Niro

[57] ABSTRACT

A method and apparatus for coating a fastener with head and shank portions is disclosed. The invention includes the steps of and apparatus for transferring the fasteners from a feed mechanism such that the fasteners are positioned for coating. The fasteners are then conveyed through a plurality of operating stations, beginning with a heating station where the shank portions of the fasteners are heated. Subsequently, at a material applying station, a coating material is applied to the heated shank portions. A preferred embodiment of the method and apparatus of the present invention includes using a magnetic holder to carry the fasteners horizontally by their head portions, heating the shank portion to a temperature above the melting point of the applied material and applying the material to the heated shank portion to form a coating thereon. The magnetic holders are part of an endless traveling belt that rotates continually. The fastener carriers have teeth that engage a rack to rotate the fasteners. A conveyor provides added air cooling for the coated fasteners, which can continue to be rotated. Also disclosed is a transfer wheel with two sets of notches that is synchronously coupled to the traveling belt for placing and aligning fasteners on the belt for coating.

11 Claims, 5 Drawing Sheets

METHOD FOR COATING FASTENERS

TECHNICAL FIELD OF THE INVENTION

This invention relates to an apparatus and method for coating fasteners, and more particularly to an improved method and apparatus for coating fasteners with shank and head portions.

BACKGROUND OF THE INVENTION

Numerous methods and devices have been employed in the past for coating fasteners. Some of these methods and devices are useful in coating certain types of fasteners, but are not as versatile in coating other types of fasteners.

Examples of such methods and devices include U.S. Pat. Nos. 3,452,714 in the names of G. F. C. Burke, Richard J. Duffy et al.; 4,120,993 to Richard J. Duffy et al.; and Re. No. 28,812 to Richard J. Duffy, one of the present inventors. The methods and devices disclosed in these United States Patents provide for the coating of fasteners in which the shank portion of the fastener depends below a pair of traveling belts. These fasteners are supported on the belts at their head portion. The methods and apparatus of the previously described patents do not provide the ability to precisely control the linear speed and rotation of the fasteners during the coating process. Also, it would be advantageous to provide a method and apparatus which would automatically and rapidly coat a wide variety of different fastener configurations and which may be adapted for use with a variety of different types of coatings.

It would also be advantageous to provide a method and apparatus which accommodates a variety of different fastener configurations and sizes and which could be quickly and easily adapted for coating such fasteners. In addition, it is desirable to provide a method and apparatus which has the versatility to coat a specified portion of the threads of the fastener, as well as the complete threaded area, and further, a method and apparatus which may coat only a specific portion of the radial distances about the threaded surface of the fastener. Furthermore, it would be advantageous to provide a method and apparatus which provides the ability to precisely control the linear speed and rotation of the fasteners to be processed.

The solutions to some of these problems have been disclosed in the application, Ser. No. 070,416, filed Jul. 7, 1987, now U.S. Pat. No. 4,842,890, the disclosure of which is incorporated herein by reference. Improvements, however, are still desirable to increase the speed and efficiency of the apparatus and method, allow for faster and easier adaptation to fasteners of different configurations and sizes, create a smoother and more even coating of material, allow the use of different types of coating, and prevent clogging of the coating nozzle.

SUMMARY OF THE INVENTION

The present invention is an apparatus that applies a coating to fasteners. Prior to having the coating applied by the appropriate means, the fasteners are passed through a heating means such as an induction coil. The fasteners travel through the heating means and by the coating means on an advancing means such as a traveling belt. Fasteners are directed onto the advancing means by a transferring means such as a transfer wheel, that receives aligned fasteners in a continuous supply.

In a preferred embodiment the traveling belt has equally spaced, removable, magnetic carrying members that hold the fastener heads. An evenly applied coating to the fastener is assured by a means for controlling the degree of surface coating on the fasteners, which can be, among other arrangements, a rack of teeth engageable with complementary teeth on the carrying members to provide for their rotation. Full rotation of the fasteners ensures an even, typically 360 degree coating of material, while a less than full rotation can limit the application of the coating to less than 360 degrees if the coating is only applied from one direction. Rotation of the fasteners after the application of the coating is complete improves the smoothness and evenness of the coating, especially with liquid coatings. Such additional rotation also facilitates cooling.

Another preferred feature of the invention is the transfer wheel that places the fastener on the traveling belt. The wheel has two sets of notches, one that carries the fasteners and another that interacts with a biased striking element to move the fasteners from the wheel to carrying members on the belt. The transfer wheel and the belt are driven by the same motor and pulley system, so that the wheel is easily adjusted to accommodate different configurations and sizes of fasteners.

In another preferred embodiment, the fasteners are moved from the traveling belt to a cooling conveyor. The conveyor belt is preferably an air permeable mesh, so that air curtains or air knives can be placed around the conveyor to more quickly cool the coated fastener.

Another desirable feature of the apparatus of the present invention is a spray nozzle that is particularly effective with powder coatings. An interior surface disburses the material, whose velocity is increased by a secondary source of air supplied at the top of the nozzle. Flattening the outlet of the nozzle provides additional control to the applicability of the coating, as does making the nozzle rotatably adjustable to accommodate various coating lengths.

Other features include a cover made of materials sold under the trademark TEFLON ® polytetrafluoroethylene for the magnetic carrying member to protect the magnet end from becoming coated when coating is applied to the entire fastener. The magnetic insert of the carrying member can also be made to be removable.

A process using the described features is also provided.

DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings, in which:

DESCRIPTION OF THE PREFERRED EMBODIMENTS

Figure 1:
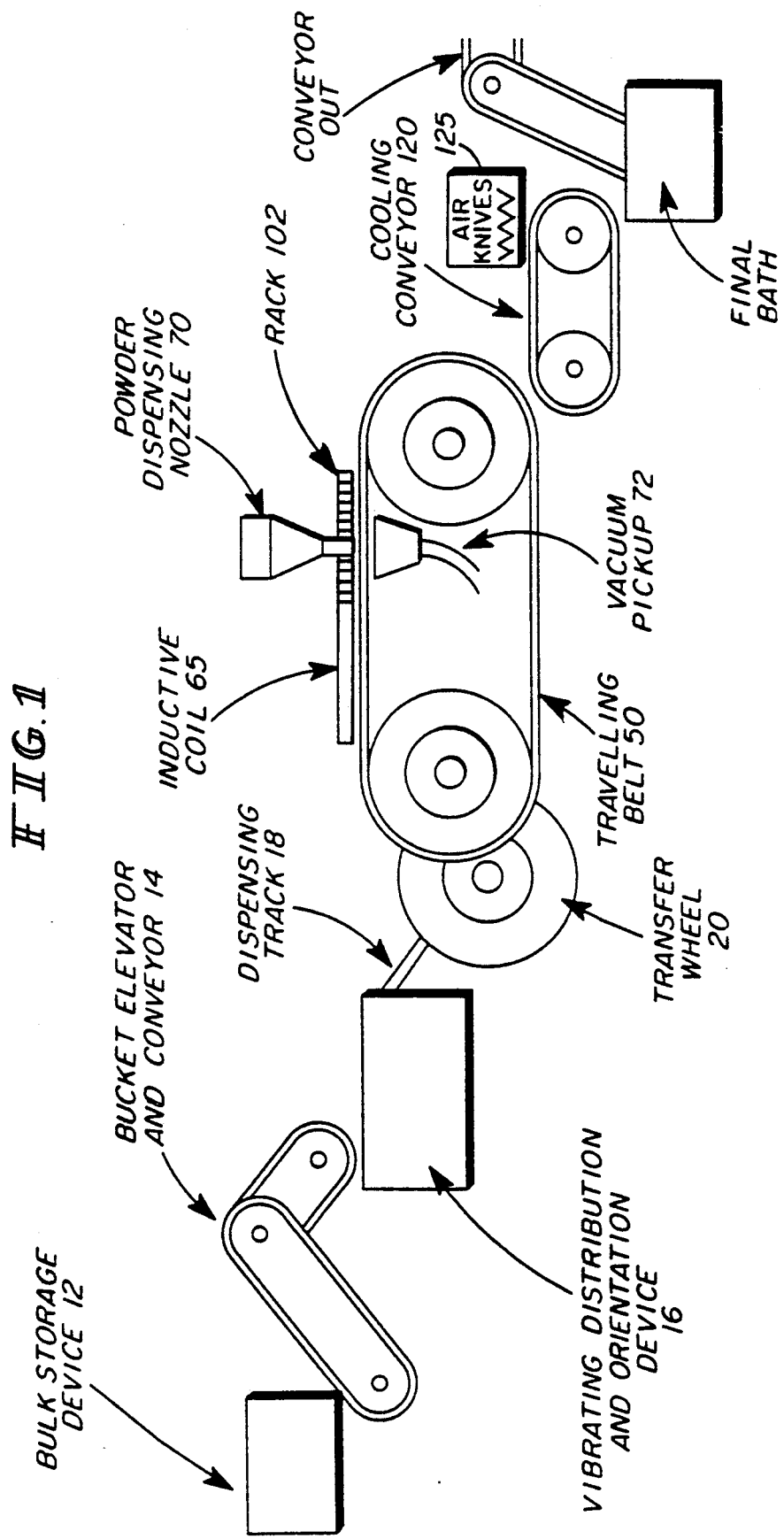
FIG. 1 is a schematic of the process and device practicing the present invention.

FIG. 1 is a schematic drawing that outlines the general features of the method and apparatus of the present invention. A general description will be followed by a more specific one. A continuous supply of fasteners is provided as fasteners are transferred from a bulk storage device 12 to a conventional bucket elevator and a conveyor 14, which dumps the fasteners into a vibrating distribution and orientation device 16, such as one commercially available from Moorfeed Corp. The fasteners emerge from the vibratory bowl onto a dispensing track 18, at which time the heads and shanks of all fasteners are aligned in the same direction. Preferably the shanks are parallel to the floor.

The fasteners then slide into notches 22 (FIG. 5 and 6) spaced equally around the perimeter of a transfer wheel 20. Transfer wheel 20 is driven by a 5 horsepower DC motor that, by way of belts and pulleys, also drives traveling belt means such as a traveling belt 50. A striking assembly (shown in FIGS. 5 and 6) displaces the fasteners onto magnetized carrying members 52 (FIG. 2) of the traveling belt. The fasteners are passed through a heating station such as an induction coil 65 to heat the surface of the fastener to a temperature at which the coating to be applied will adhere. In the case of power sold under the trademark TEFLON ®, approximately 700°-900° Fahrenheit is the preferred temperature range. Still more preferable is approximately 775°-825° Fahrenheit. This can be achieved by a variety of methods. One such method is induction heating, utilizing a 75 kilowatts—10k Hz power supply and an appropriate induction coil. This low frequency provides deeper current penetration for heating of the fastener at reduced costs. The power to the coil can, of course, be varied by the appropriate controls known to those in the art. As one skilled in the art may appreciate, a variety of power supplies with various power ratings and operating frequencies can be used, depending on the type and size of fasteners to be processed.

After the fasteners pass through the induction coil, a rack of teeth 102 engages and begins to rotate the fasteners, which then pass under a device that dispenses the material used for forming the coating on the fasteners. Powdered materials for forming such coatings are supplied in a manner described in part in the previously incorporated references, specifically through a dispensing nozzle 70 onto the fasteners. Excess powder is salvaged by a vacuum pick-up 72 on the other side of nozzle 70. To ensure an even coating, the fasteners can be further turned subsequent to the application process. Depending upon the necessary parameters of the coating process, the rack of teeth can be used to rotate the fasteners at any position in the heating, coating, and/or cooling steps of the process.

A cooling conveyor 120 is provided to further cool the fasteners before they are immersed in a final bath for cooling and/or the application of a rust inhibitor. The conveyor 120 can be operated in ambient conditions, or it can be used in association with devices such as air amplifiers or air knives 125. Additional cooling may be utilized to lower the temperature of the fasteners below the boiling point of the final bath. In addition, when a coating sold under the trademark TEFLON ® is used, gradual cooling is preferred to allow the coating sold under the trademark TEFLON ® time to set. Otherwise rapid cooling may reduce the quality of the bond between the fastener and the coating, resulting in a lower level of adhesion.

Figure 2:
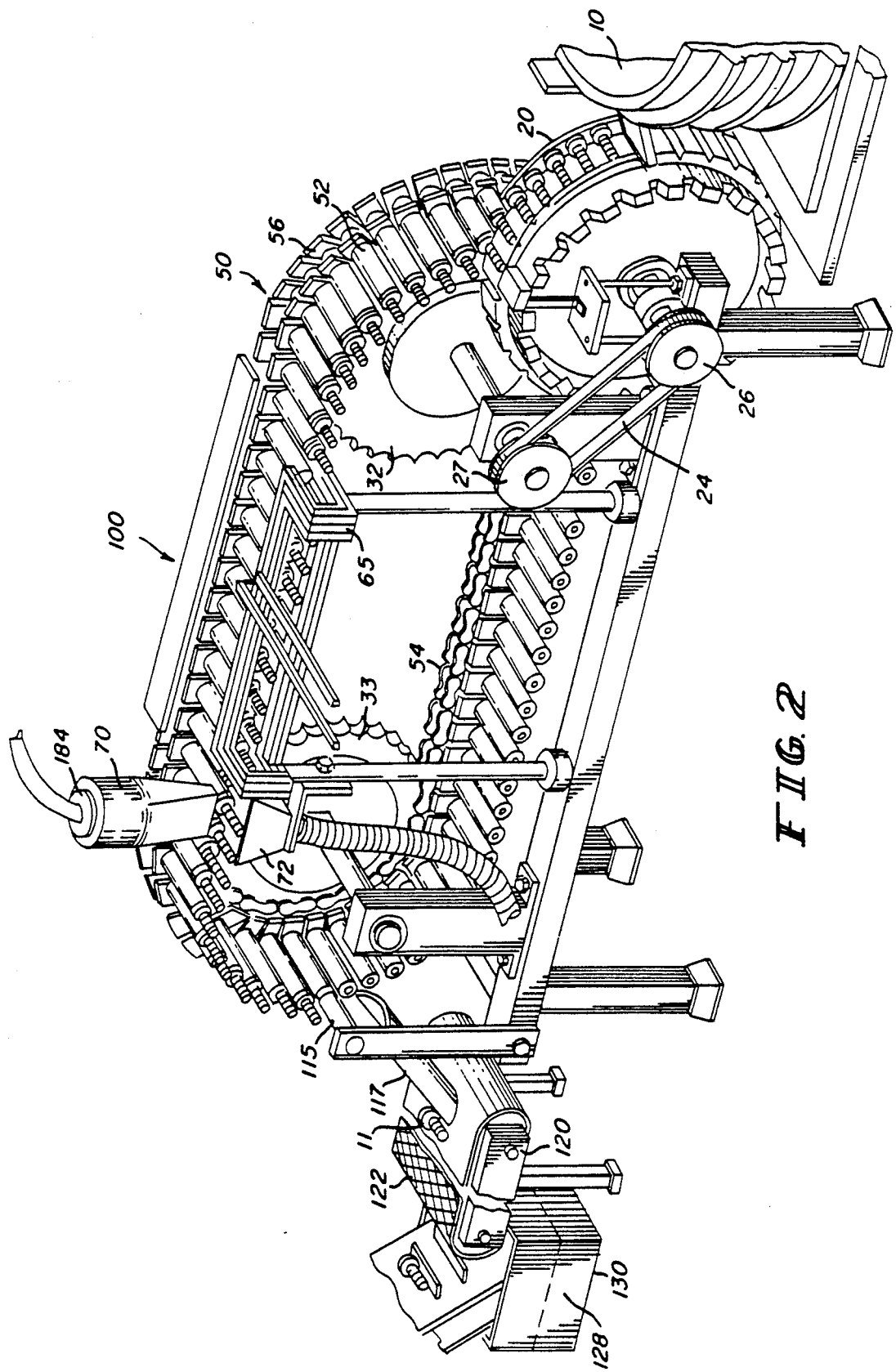
FIG. 2 is a perspective view of an apparatus practicing the present invention.

FIG. 2 depicts in detail many of the aspects of the present invention. A portion of the means for providing a continuous and aligned supply of fasteners is shown generally as 10, and incorporated in the apparatus of FIG. 1 including bulk storage device 12, bucket elevator and conveyor 14, vibrating bowl 16, and dispensing track 18. These are all commercially available and known to those of ordinary skill in the art.

As the fasteners 11 come off the dispensing track 18, they are aligned preferably so that the shanks are horizontal and the heads are vertical. The shanks slide into a first set of notches 22 on transfer wheel 20. Transfer wheel 20 can be directly turned by an output shaft connected to a direct current (D.C.) motor (not shown, see U.S. patent application Ser. No. 070,416) or by a belt 24 and pulleys 26 and 27. If the motor is not connected directly to transfer wheel 20, then it drives sprocket 32 which turns traveling belt 50. By means of the belts and pulleys, preferably, one motor synchronously turns the transfer wheel 20 and traveling belt 50. In this way, the traveling belt and the transfer wheel can preferably be adjusted into alignment quickly to accommodate a variety of fastener sizes.

Figure 3:
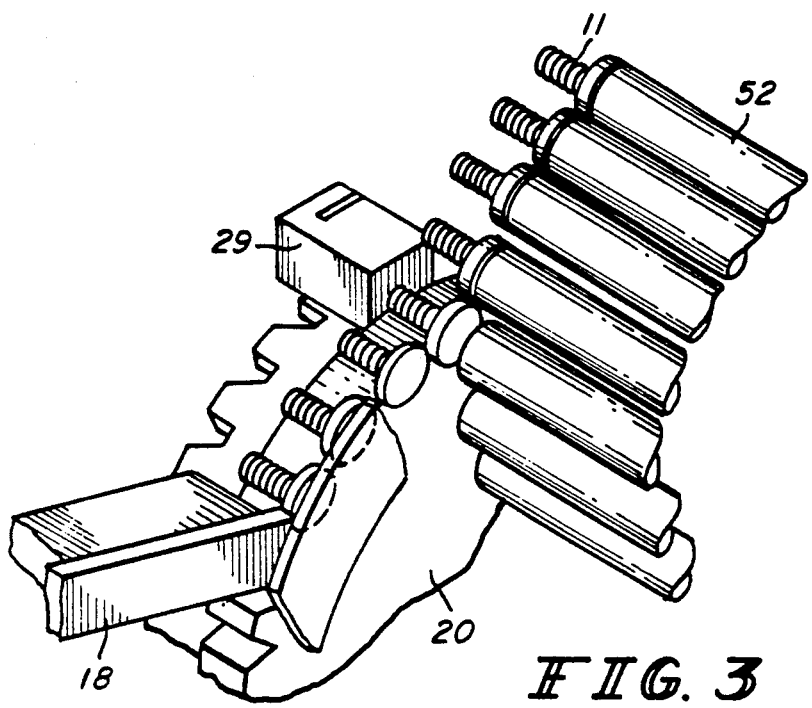
FIG. 3 is a perspective view of portions of the aligning means, transfer wheel and traveling belt of the apparatus of FIG. 1.
Figure 5:
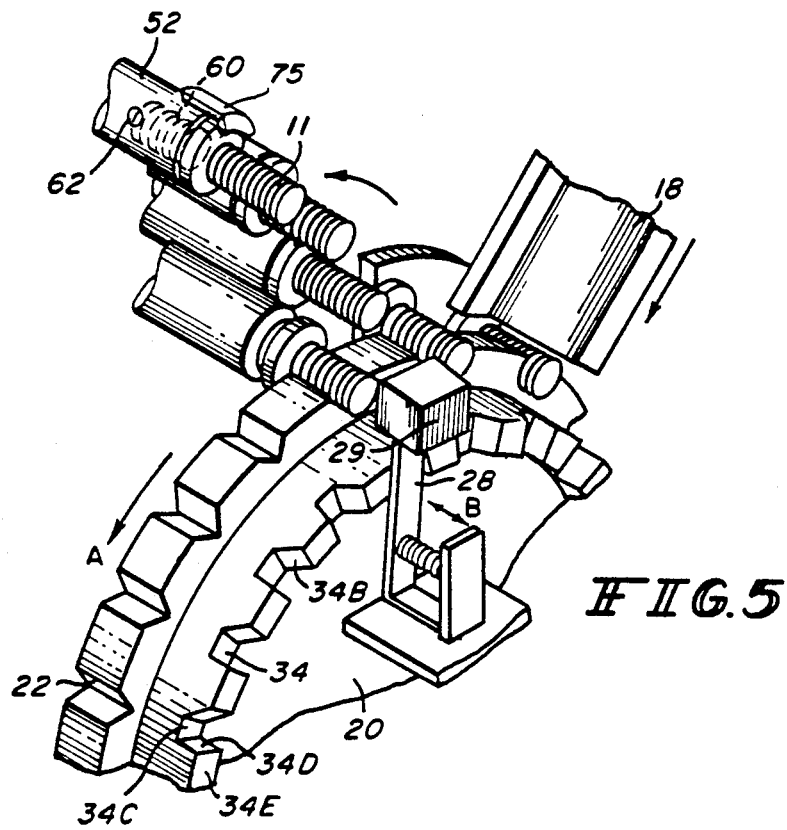
FIG. 5 is a perspective view of the transfer wheel of the apparatus of FIG. 1 with the striking member biased away from a fastener and the traveling belt.
Figure 6:
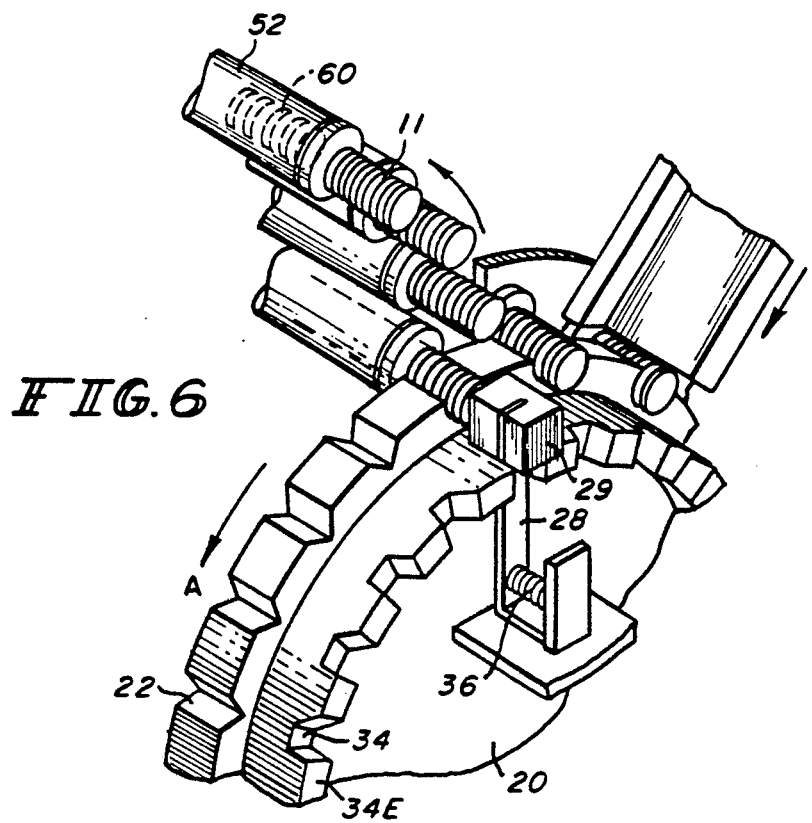
FIG. 6 is a perspective view of the striking member of the apparatus of FIG. 1 after it has been biased into one of the second set of notches to transfer the fastener to the traveling belt.

The principal features of the structure and operation of the transfer wheel 20 are depicted in FIGS. 3, 5, and 6. As noted earlier, a head 29 of striking element 28 contacts fastener 11 at the moment the fastener is aligned with a magnetic carrying member 52. The fastener 11 is then held by the magnetic force of carrying member 52 as the fastener is lifted out of the notch by the motion of the belt 50 and associated carrying member 52.

Particularly as shown in FIGS. 5 and 6, wheel 20 also has a second set of notches 34 on the side of the wheel which preferably cooperate with striking element 28 biased by spring 36. The notches 34 are preferably trapezoidal in shape, with striking element 28 biased to move into the notch. As the wheel rotates in the direction of Arrow A, angled side 34B works against the biasing force (Arrow B) exerted by spring 36 to move striking element 28 upwardly from lower notch surface 34C to flat upper notch surface 34E. As the wheel continues to rotate, surface 34E slides against striking element 28 until the edge of the striking element completely clears the upper surface 34E and the edge of vertical side 34D. Spring 36 then pushes element 28 completely into the next notch. Head 29 of striking element 28 then engages fastener 11 moving it into contact with magnetic carrying member 52.

Figure 4:
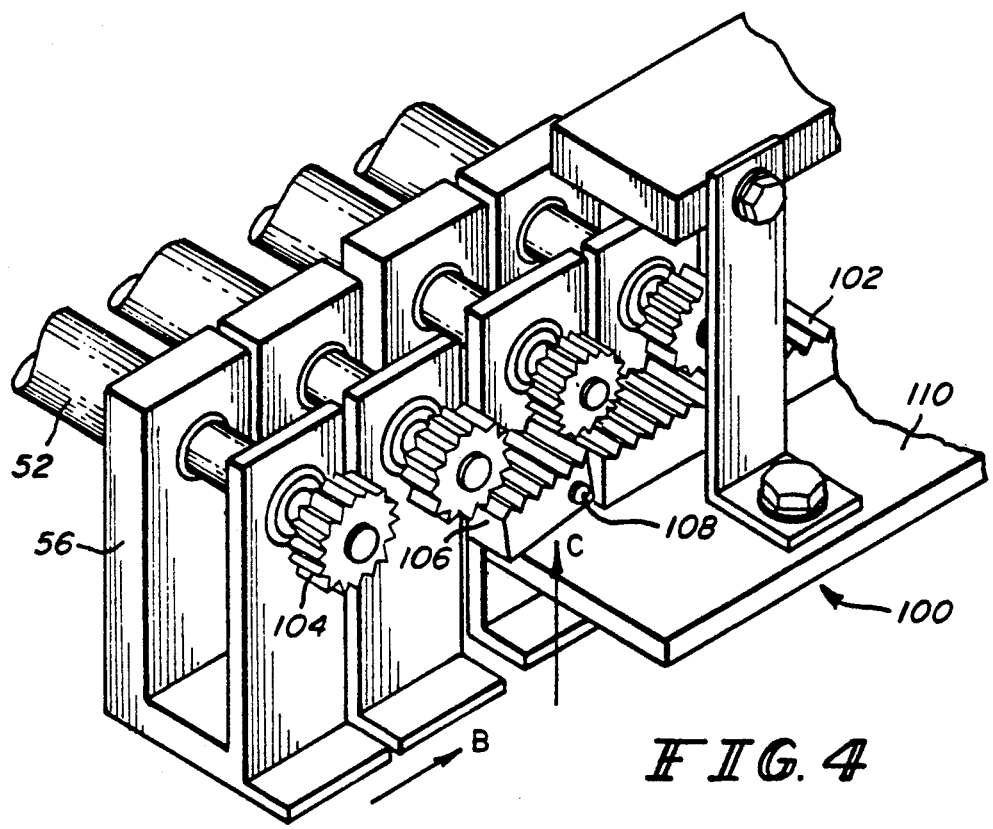
FIG. 4 is a perspective view of the geared ends of the carrying members of the apparatus of FIG. 1 as they engage the rack of teeth for rotation.

Traveling belt 50 is preferably an endless chain of links 54 that is driven by sprocket 32 and supported by a second sprocket 33 (FIG. 2). Although other types of carrying assemblies such as belts, wire, cords and the like can also be used. Various structures, such as connectors 56, can be used to connect carrying members 52 to chain links 54 (FIG. 4). The carrying members 52 are preferably hollow, so that permanent magnets 60 can be inserted and held in place by set screw 62, thus forming a magnetic holding means (FIGS. 5 and 6). This configuration has the advantage of securing the fastener in correct position for coating. The carrying members are preferably aluminum shells, while the inserts are preferably ALNICO V heat resistant permanent magnetic assemblies.

Fasteners 11 are moved through a heating station, such as induction coil 65, and then under a means for applying the coating material, such as nozzle 70. A means for removing excess coating material, such as vacuum pick-up 72, is associated with the application nozzle. A drip pan or other drainage device can be used if the coating material is a liquid. The coating material, preferably a powder material, is applied from a source (not shown) that preferably fluidizes the powder and conveys it under pressure to the nozzle 70. Other embodiments, however, are also contemplated where a powder coating material may be provided by a vibratory gravity feed device, or a liquid coating material is provided under pressure or gravity, depending upon the physical characteristics of the material. Electromechanical and hydraulic control of the coating application, belt speed, heating element, and other devices with variable characteristics can be exercised by various means known to those of skill in the art.

As shown in FIG. 4, carrying members 52 are rotated by an assembly 100 for controlling the degree of surface coating on the fasteners. Assembly 100, as included in the apparatus of FIG. 1, may include a rack of teeth 102 engageable with rotating pinions 104 on the ends of rotating carrying members 52. The first portion 106 of rack 102 (with reference to the motion of belt 50, as signified by Arrow B) is separate from the remainder of rack 102 and pivotable about spindle 108. This facilitates proper and efficient engagement of the pinions 104 with teeth 102. Without the pivoting capability, the teeth of the two engaging objects might not mesh properly. A biasing member (not shown) is located between lower plate 110 and first portion 106 to create a biasing force as shown by Arrow C. Any one of a number of different types of springs, attached to spindle 108 or under first portion 106, can provide the necessary force.

Typically controlling means 100 will rotate the fasteners through 360° during the application of the coating material, although specific lengths of rack 102 can result in rotations more or less than 360° to provide coating of selected circumferential portions of each fastener 11. When rack 102 is removed, the fasteners typically are coated on "one side," i.e., 180° degrees of the shank. Rack 102 can be extended in either or both directions from the coating application station. The extension of rack 102 beyond the coating station enables the continuing rotation of the fastener for a period of time limited only by the length of belt 50 and teeth 102. The same technique is also effective when a liquid coating, such as the liquid coating sold by Nylok Fastener Corporation under the trademark PRECOTE®, is applied. If the fasteners are sufficiently rotated, the need is eliminated to remove drops of liquid that otherwise form on the bottom of the fastener. Such removal would typically be performed by a stationary brush located adjacent to the belt.

When rotation of the fastener is no longer necessary, the belt 50 can be moved by stationary discharge cam 115, which contacts the heads of each passing fastener 11 and causes each fastener to slide off the end of magnet 60, down slide 117, and onto cooling conveyor 120. Cooling conveyor 120 preferably includes a mesh belt 122 that permits the easy movement of air around fastener 11. Ambient air can be used to further cool the fastener, or forced air can provide additional cooling. As shown schematically in FIG. 1, air amplifiers or air knives 125 can blow forced air in and around the fasteners for still additional cooling.

The final step of the coating process should include the immersion of the fasteners in a liquid bath material 128, as contained in receptacle 130. The bath material 128 can be water, oil, or another chemical agent. The bath is designed to cool the fastener to a temperature relatively close to ambient, and can also provide a coating of rust inhibitor on the fastener.

Finally, the fasteners are moved out of the bath by conveyor 135 and move to another location for storage or packing.

Figure 7:
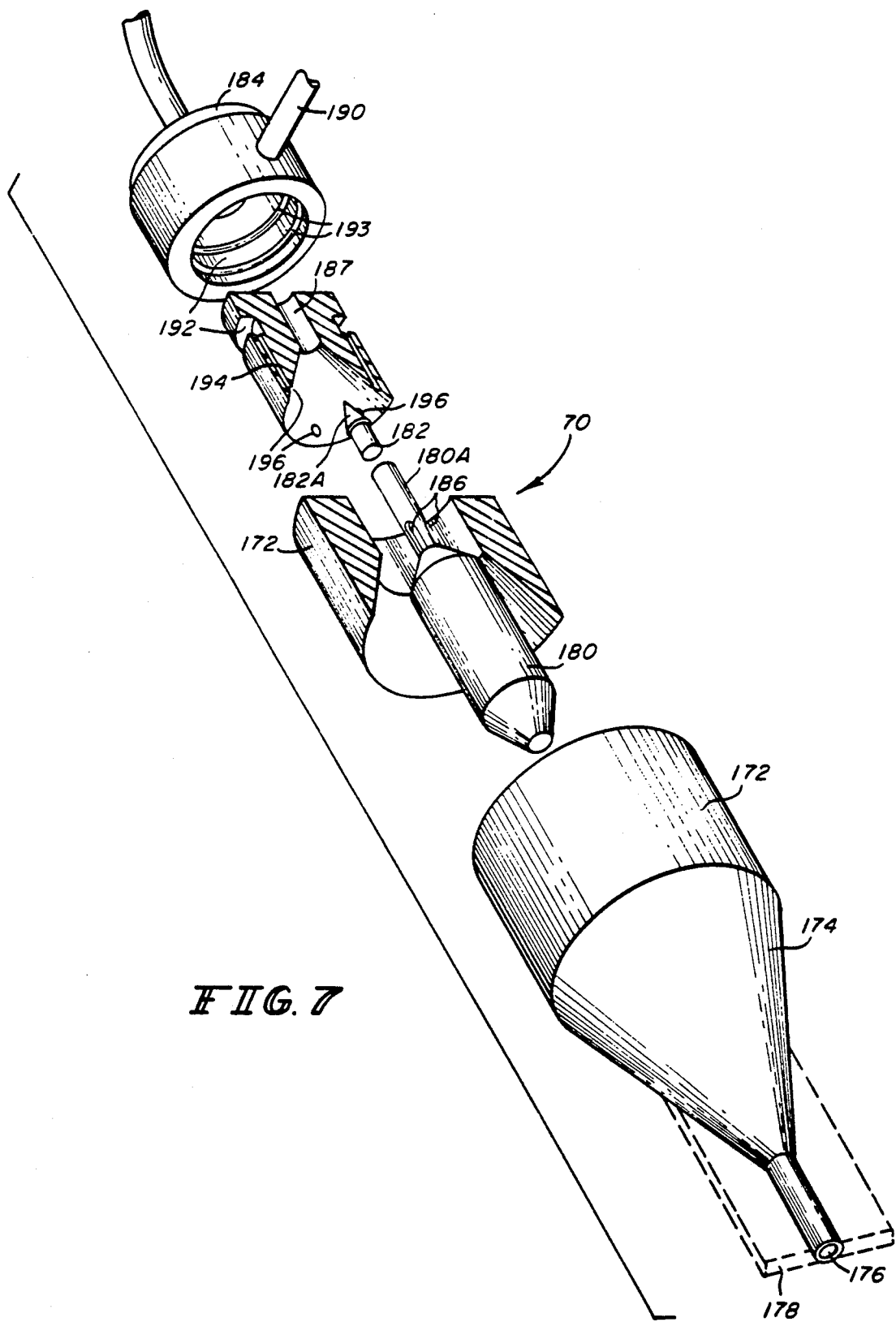
FIG. 7 is an exploded view of an applicator nozzle with a flattened outlet shown in phantom.

FIG. 7 depicts an exploded view of the preferred embodiment of the nozzle 70 used to spray powdered material such as powder sold under the trademark TEFLON® on the fasteners. The preferred nozzle includes a cylindrical body portion 172 with a conical end 174. The tip of the nozzle 70 can be a small outlet 176, or a broader, flatter one as shown in phantom as 178. Inside body portion 172 is a torpedo 180 for dispersing powder. Torpedo 180 is located toward the opening end of body 172. After the powder has entered the nozzle at top 184, it moves through passageway 187, and then encounters a smaller, cone torpedo 182 which is surrounded by annular element 180A projecting from torpedo 180. Cone 182A of cone torpedo 182 thus initially disperses the powder after it has entered the nozzle at top 184 into three slots 186 (only two of which are shown) spaced radially around cone torpedo 182. To accelerate the powder and prevent clogging of the outlet, a secondary source of air is provided through hose 190 into manifold 192. Preferably, the secondary air source should be pressurized above the pressure level of the incoming powder that is transported by a primary air source. This secondary air source assists in providing a steady and even flow of powder to and at the output of nozzle 70. This preferred configuration substantially eliminates any flutter in the powder output and provides an improved, uninterrupted supply of powder which assures an improved coating on each fastener.

The secondary air is fed from manifold 192 sealed by 0-rings 193, through passageway 194, out apertures 196, and into the interior chamber defined by the outside of body portion 172 and conical end 174. The configuration of the apertures can be embodied several ways. One embodiment includes apertures 196 spaced approximately 30 degrees on either side of each slot 186. Other forms could include a series of 12 equally spaced apertures 196 or a cylindrical manifold, extending laterally the complete circumference of nozzle 70 and vertically from manifold 192 to aperture 196 as now depicted in FIG. 7.

Another desirable feature is to make the nozzle 70 rotatable about an axis extending from its outlet to its top. Thus, when the nozzle end is configured as shown by the flattened outlet 178, the length of the shank portion of the fastener that receives a coating of material can be controlled. The capability to rotate nozzle 70 approximately 180 degrees is preferred. Vacuum pick-up 72 could be adapted to rotate with nozzle 70, or, alternatively, could be made large enough to eliminate the need for rotation.

The present invention can also be used with liquid coatings, such as the liquid coatings sold by Nylok Fastener Corporation sold under the trademark PRECOTE®. The fastener is initially heated by an induction coil to approximately 150° Fahrenheit, coated, and rotated to obtain a uniform 360 degrees coating on the fastener. Heat is applied after the application process to dry the coating. Subsequent post coating operations are designed to remove the carrier solvent or dispersing medium from the coating.

The method and apparatus of the present invention can be adapted for a wide variety of liquid coating applications. Either gravity or pressure can be used in applying the coating. Moreover, a broad range of viscosities of the liquid coating can be accommodated, including water or solvent based dispersions and/or solutions. These include coatings such as a toluene-based coating sold under the trademark PRECOTE ® 80 or a water-based coating sold under the trademark PRECOTE ® 5.

If it becomes desirable to coat the sides of the head of the fastener, thin caps can be used to cover the otherwise exposed magnet to prevent accumulation of the coating on the magnet 60 and carrying member 52. Such caps can be made of a material such as those sold under the trademark TEFLON ® or any other suitable material. In the same manner as the caps, a longer adaptive element can slide over a longer part of carrying member 52. The adaptive element can have a saddle or clip end, such as clip 75 shown in FIG. 5, that will mechanically hold the head of a non-ferromagnetic fastener or stud.

Of course, it should be understood that various changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

What is claimed is:

1. A method of continuously applying a coating material to fasteners, comprising:

providing a continuous feed line of fasteners in which the fasteners are uniformly aligned;

moving the fasteners to equally spaced notches on a rotating wheel;

transferring the fasteners from said rotating wheel to a continuous belt with fastener holders that are synchronously alignable with said equally spaced notches;

rotating said continuous belt to advance the fasteners;

advancing the fasteners on said belt through a heating station to raise the temperature of the fasteners above the melting point of the coating material;

applying the coating material to at least a portion of said fasteners as the fasteners are advancing on said belt; and rotating said fastener holders during the application of the material.

2. The method of claim 1 further comprising the step of cooling said fasteners in ambient air after the material is applied.

3. The method of claim 2 further comprising the step of immersing said fasteners in a liquid to provide further cooling.

4. The method of claim 2 furthering comprising the step of additionally cooling said fasteners with pressurized air.

5. The method of claim 2 further comprising the step of applying a rust inhibitor to said fasteners.

6. The method of claim 1 further comprising the step of collecting and removing material that does not adhere to the fasteners during the application step.

7. The method of claim 1 wherein said fastener holders are magnetic and are rotated at least 360 degrees to coat the entire circumference of said fastener shank portion, said magnetic fastener holders properly orienting said fasteners in position for coating.

8. The method of claim 1 whereby said fastener holders are magnetic and are rotated by engaging a rack of teeth positioned generally proximate and parallel to said continuous belt.

9. The method of claim 1 further comprising the step of rotating the fasteners after coating to achieve a smoother and more even coating finish.

10. The method of claim 1 wherein the coating material is applied with an accurately adjustable nozzle.

11. The method of claim 10 wherein said nozzle is rotated about its own axis to decrease and increase the applied coating surface area on the shanks of the fasteners.

* * * * *